United States Patent
Faulkner et al.

(10) Patent No.: US 7,249,443 B2
(45) Date of Patent: Jul. 31, 2007

(54) INSULATED PITCHED TILE ROOFING SYSTEM AND METHOD OF INSTALLING SAME

(75) Inventors: David H. Faulkner, Bradenton, FL (US); Robert L. Ferrante, Davie, FL (US); E. Richard Huber, Houston, TX (US); Pat L. Murray, Springs, TX (US)

(73) Assignee: Polyfoam Products, Inc., Tomball, TX (US)

( * ) Notice: Subject to any disclaimer, the term of this patent is extended or adjusted under 35 U.S.C. 154(b) by 0 days.

(21) Appl. No.: 10/294,959

(22) Filed: Nov. 14, 2002

(65) Prior Publication Data

US 2003/0089445 A1     May 15, 2003

Related U.S. Application Data

(60) Provisional application No. 60/334,787, filed on Nov. 15, 2001.

(51) Int. Cl.
*E04B 1/74*       (2006.01)
*E04B 7/02*       (2006.01)
(52) U.S. Cl. ............... 52/411; 52/90.1; 52/746.11; 52/409
(58) Field of Classification Search ............ 52/90.1, 52/90.2, 91.1, 91.3, 309.1, 309.3–309.6, 52/309.8, 344, 408, 411, 518–531, 533–560, 52/745.21, 746.1, 746.11; 428/53, 40.1, 428/40.3, 42.1; 156/71, 91, 290, 291
See application file for complete search history.

(56) References Cited

U.S. PATENT DOCUMENTS

| 2,152,080 | A |   | 3/1939  | Munsey |
| 3,200,026 | A |   | 8/1965  | Brown |
| 3,411,256 | A |   | 11/1968 | Best |
| 3,468,086 | A | * | 9/1969  | Warner ............ 52/173.1 |
| 3,646,715 | A |   | 3/1972  | Pope |
| 3,698,972 | A |   | 10/1972 | Lenzner |
| 3,760,546 | A |   | 9/1973  | Martin et al. |
| 4,021,981 | A | * | 5/1977  | Van Wagoner ........ 52/309.13 |
| 4,036,673 | A |   | 7/1977  | Murphy et al. |
| 4,063,395 | A |   | 12/1977 | Stewart et al. |
| 4,087,296 | A |   | 5/1978  | Hooker |

(Continued)

FOREIGN PATENT DOCUMENTS

EP         0135913 A2    4/1985

(Continued)

OTHER PUBLICATIONS

English Abstract of FR 2,753,470.*

(Continued)

*Primary Examiner*—Chris Fiorilla
*Assistant Examiner*—Sing P. Chan
(74) *Attorney, Agent, or Firm*—Douglas W. Rommelmann; Andrews Kurth LLP

(57) ABSTRACT

The present invention is an insulated pitched roofing system for a sloped deck in which an insulating sheet is adhered to the sloped deck or to a roofing substrate and the roof tiles are adhered to the insulating sheet with a polymer adhesive. The polymer adhesive is preferably a froth liquid polyurethane foam.

12 Claims, 2 Drawing Sheets

U.S. PATENT DOCUMENTS

| | | | |
|---|---|---|---|
| 4,160,346 A | 7/1979 | Kaufmann | |
| 4,244,901 A | 1/1981 | Wencley et al. | |
| 4,315,391 A | 2/1982 | Piazza | |
| 4,636,425 A | 1/1987 | Johnson et al. | |
| 4,707,961 A | 11/1987 | Nunley et al. | |
| 4,996,812 A | 3/1991 | Venable | |
| 5,219,097 A | 6/1993 | Huber et al. | |
| 5,253,461 A | 10/1993 | Janoski et al. | |
| 5,362,342 A | 11/1994 | Murray et al. | |
| 5,441,583 A | 8/1995 | Eaton et al. | |
| 5,895,536 A | 4/1999 | Starr et al. | |
| 5,951,796 A | 9/1999 | Murray | |
| 6,164,021 A | 12/2000 | Huber et al. | |

FOREIGN PATENT DOCUMENTS

| | | | |
|---|---|---|---|
| EP | 0497725 A1 | 8/1992 | |
| EP | 516012 A1 * | 12/1992 | |
| FR | 2753470 A1 * | 3/1998 | |
| GB | 1257826 | 12/1971 | |
| JP | 2304165 | 12/1990 | |
| JP | 5112770 | 7/1993 | |
| WO | WO 99/43906 | 9/1999 | |

OTHER PUBLICATIONS

Amex brochure in Japanese, 29 pages, (date unknown), no English translation available.

* cited by examiner

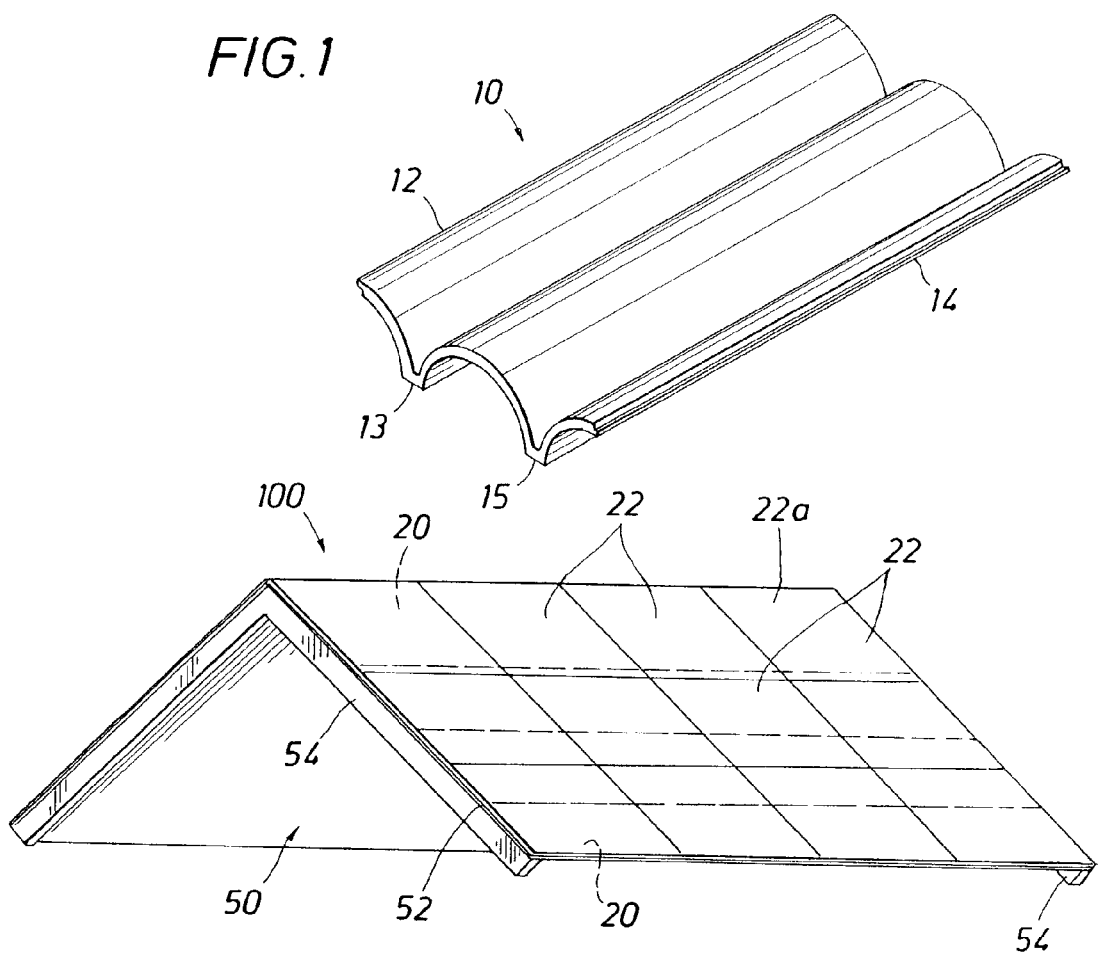
FIG. 1
FIG. 2
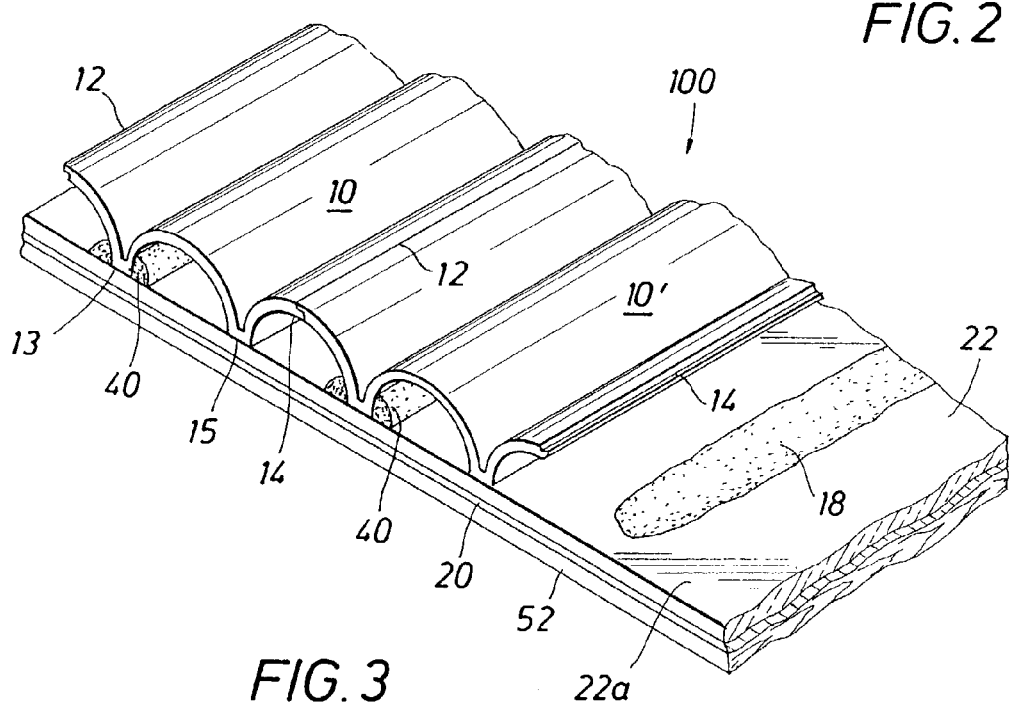
FIG. 3

INSULATED PITCHED TILE ROOFING SYSTEM AND METHOD OF INSTALLING SAME

CROSS-REFERENCE TO RELATED APPLICATIONS

The present application claims priority from Provisional Application Ser. No. 60/334,787, filed on Nov. 15, 2001.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to a pitched tile roofing system, and particularly to a system for insulating the pitched tile roof and attaching roofing components, and a method for installing the system.

2. Description of the Related Art

There are two basic types of roofs: flat and pitched. Pitched roofs come in a few basic styles, all of which are relevant to the present invention. A duo-pitched roof has two sloping sides joined along the top with end vertical walls called a gable end. This is probably the most common form of pitched roof. If the end of the roof is also sloping it is termed hipped. If two sections of roof meet at an angle, such as a right angle, the junction between the two roof sections is termed a valley.

Various roof components are used as roof coverings on pitched roof decks. One example of roof component is a roof tile. Roof tiles are extremely durable and provide significant aesthetic and decorative effects to the structures to which they are applied. Roof components or coverings as described herein may be made of cementitious materials and also brick, stone, clay, plastic, wood, metal, rubber or bituminous materials.

A typical pitched roofing system includes sheets of wood, typically plywood or decking material, nailed to the truss rafters to form a pitched roof deck. Other pitched roof decks may be made with materials such as steel or concrete. Typically, the pitched roof deck is overlaid with a roof substrate made of a waterproofing material. Typically, the waterproofing material forming the roof substrate is a roll goods membrane or underlayment comprising one or more plies of asphaltic or modified bitumen impregnated felt attached to the pitched roof deck. The felt is typically attached to the pitched roof deck by nails and/or adhesive. Felt is generally made of wood pulp and rag or of asbestos, polyester or glass fibers. Self-adhering membranes, commonly referred to as "peel and stick," may also be used. These membranes are generally modified bitumen impregnated fiberglass or polyester fibers. Some pitched roof systems having steel or concrete decks do not require the use of a waterproof membrane or coating.

Roof components are primarily secured to the pitched roof deck with mechanical fasteners. Nails are the primary mechanical fasteners for securing roof components to a wood deck. Typically, tile roof components are secured with nails, inserted through holes in the tile roof component, driven into and through the roof substrate and wood deck. Mortar is sometimes used in conjunction with nails to provide holding force of the tile roof component to the roof deck. In either case, it is undesirable to drive numerous holes through the roof substrate and wood deck since these nail holes provide a potential leak path in the pitched roofing system. High wind loading conditions also affect the roof components secured with nails. In areas near salt water the effectiveness of nails is diminished over time due to corrosion of the nails. Additionally, nails get loose over a period of time. Some decks, such as concrete or steel decks, cannot be nailed into. Non-nailable decks (concrete, steel, etc.) use a wire tie or other cumbersome and expensive system to fasten the roof components to the pitched roof deck.

As stated above, mortar or similar binders are often used as a secondary fastener between tile roof components and the roof substrate. Using mortar is a slow procedure and labor intensive as the mortar must first be prepared, typically at ground level, in buckets which must then be raised to the pitched roof deck, and then the mortar is applied to the roof substrate. The mortar adds unnecessary weight to the roofing system. The set-up time of the mortar increases the time required to form the bond between the tile roof component and the roof substrate. The installed tile roof components should not be disturbed until the mortar has set-up as movement of the tile roof component affects the bond. Furthermore, the strength of the completed bond between the tile roof component and the roof substrate can be unsatisfactory. Typically, an approximate 60-pound tensile load applied transversely to the tile roof component will break the mortar bond between the tile roof component and the roof substrate. During high wind loading conditions, such as that experienced during a hurricane or a tornado, the tile roof components frequently release from the roof structure and become life threatening, flying projectiles. During such events, the tile roof components are widely strewn about and scattered throughout the area. The flying tile roof components result in additional danger during these devastating events and further increase the tremendous burden of clean up after these catastrophic events.

Assignee's U.S. Pat. No. 5,362,342 discloses a method of bonding tile roof components to a roof substrate utilizing polyurethane foam as the bonding medium. The method includes the step of applying under low pressure a stream of two component foamable liquid polyurethane on a prepared roof substrate. The foamable liquid polyurethane has a density preferably in the range of one and one-half to two pounds per cubic foot and a reactivity period in the range of one and one-half to four minutes. The foamable liquid polyurethane is preferably applied at a rate in the range of two to three pounds per minute. The tile roof component is placed into contact with the foamable liquid polyurethane during the reactivity period of the foamable liquid polyurethane. The bond between the tile roof components and the roof substrate with the polyurethane foam is several times increased over the mortar and mechanical bonds.

It is desirable to provide an energy efficient pitched tile roofing system at a reasonable cost. Thus, it is desirable to have a pitched tile roofing system that provides insulation to reduce energy consumption. It is also desirable in a pitched tile roofing system to minimize the difficulty of precisely aligning and installing the rows of roof tiles to assure the most aesthetically pleasing appearance of the installed roofing system. Furthermore, it is desirable that the method of installation be a simple operation, non-labor intensive, economical and not require excessive installation time. Additionally, the pitched tile roofing system should withstand the long-term effects of temperature and climatic variations experienced by the pitched tile roofing system under normal circumstances.

BRIEF SUMMARY OF THE INVENTION

One embodiment of the present invention includes an insulated pitched tile roofing system and method of installation for a sloped or pitched roof deck of wood, metal, concrete or other material. The pitched tile roofing system according to an embodiment of the present invention is energy efficient and is particularly suited to a roof having a 2:12 pitch or greater.

An insulating component according to an embodiment of the present invention includes a board or sheet material which is adhered to the roof deck. Preferably, the sheet material includes a substantially flat lower surface and an upper surface. The lower surface is preferably adhered to the roof substrate on the roof deck with a polymer adhesive. The roof tiles are preferably adhered to the upper surface of the sheet material with the polymer adhesive.

An alternative embodiment of the present invention includes the sheet material having a contoured upper surface corresponding with the tile profile to be installed. The contoured upper surface provides guidance in properly placing and aligning the roof tiles on the roof for ease of installation and a more pleasing appearance.

The method of installing the pitched tile roofing system according to an embodiment of the present invention is a simple operation, non-labor intensive, economical and does not require excessive installation time. The pitched tile roofing system will withstand the long-term effects of temperature variations and climatic conditions experienced by the pitched tile roofing system under normal circumstances.

BRIEF DESCRIPTION OF THE SEVERAL VIEWS OF THE DRAWINGS

The objects, advantages, and features of the invention will become more apparent by reference to the drawings which are appended hereto and wherein like numerals indicate like parts and wherein an illustrated embodiment of the invention is shown, in which:

FIG. 1 is a perspective view of a typical roof tile that can be used with an embodiment of the pitched tile roofing system of the present invention;

FIG. 2 is a perspective view of a pitched roof deck having a roof substrate applied to the roof deck and a layer of insulating sheets applied to the roof substrate;

FIG. 3 is a perspective view of a portion of the pitched tile roofing system with a lower row of roof tiles being adhered to the insulating sheet;

DETAILED DESCRIPTION OF THE INVENTION

Figure 4:
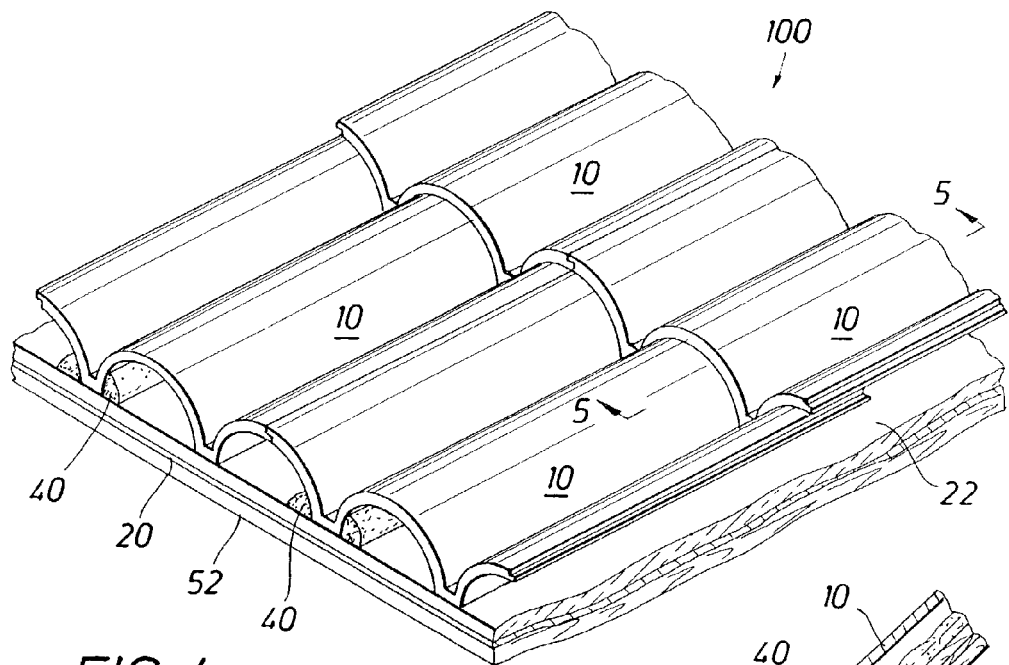
FIG. 4 is a perspective view of a portion of the pitched tile roofing system with an upper row of roof tiles overlapping the lower row of roof tiles.

The insulated pitched tile roofing system and method of installing same, generally designated as 100, will now be described in greater detail with specific reference to the drawings. Referring to FIG. 1, the pitched tile roofing system 100 includes a roof component, designated generally as 10. The roof component 10 shown in perspective view in FIG. 1 is known as a semi-circular roof tile. It is to be understood that the system and method of the present invention 100 is not limited to semi-circular roof tiles. Rather, the system and method 100 can include roof components 10 of other types and configurations. For example, flat roof tiles and reverse curve roof tiles are just a few of the other types that can be used with the system and method 100. Typically, the tile components 10 are made from cementitious or clay materials. It is also to be understood that the system and method of the present invention 100 is not limited to clay or cementitious roof tiles 10 but is also applicable to roof components 10 made from other materials including, but not limited to, brick, stone, plastic, wood, rubber, or bituminous materials.

As shown in FIGS. 1 and 3, the semi-circular tile roof component 10 typically includes an interlocking connection at the first and second longitudinal edges 12 and 14, respectively, of the tile roof component 10. Referring to FIG. 3, the second edge 14 of the first tile roof component 10 mates with the first edge 12 of an adjoining second tile roof component 10'. This type of interlocking connection for tile roof components 10 is well known in the art. The tile roof component 10 as shown in FIG. 1 includes a first pan portion 13 and a second pan portion 15. Typically, the pan portions 13 and 15 extend the length of the tile roof component 10. It is to be understood that the pan portions 13 and 15 are part of the illustrated roof component 10, but are not essential to the invention.

A pitched roof deck, generally designated as 50, is shown in FIG. 2. Typically, the pitched roof deck 50 is comprised of sheets of plywood or decking material 52 nailed to a plurality of truss rafters 54 or installed to other structural members or structural supports. The decking material 52 is typically in 4-foot by 8-foot sheets. Although not shown, the sheets of decking material 52 are positioned end to end and side to side. Typically, a plurality of nails is driven through the decking material 52 into the truss rafters 54. The truss rafters 54 are typically on 24-inch or 16-inch centers. A sheet of decking material 52 is thus nailed to approximately 5 or 7 truss rafters 54. It is to be understood that several truss rafters 54 have been omitted for clarity in FIG. 2. It is also to be understood that the roof deck 50 may alternatively be constructed of concrete, metal or other material.

Preferably, a roofing substrate 20 forming a waterproof coating is applied and preferably bonded to the upper surface of the decking material 52. The roofing substrate 20 can be a felt, commonly used in the roofing industry. The felt is a rolls good membrane that is fastened to the decking material 52, typically with mechanical fasteners such as nails and/or bonded to the decking material with, for example, tar or bitumen. The felt is typically applied along the length of the roof with an adjacent row of the felt overlapping the edge of the prior row of felt. The roofing substrate 20 protects against rain and moisture coming into contact with and passing through the pitched roof deck 50. It is to be understood that in some circumstances the roofing substrate 20 may not be desired or necessary for the present invention.

Referring to FIG. 2, an insulating component 22 is shown in position on the pitched roof deck 50. Preferably, the insulating component 22 is a board or sheet material, preferably a styrofoam sheet. The insulating component 22 is preferably adhered to the roofing substrate 20, if used, or to the decking material 52 of the roof deck 50 if the roof substrate 20 is not used. Preferably, the insulating sheet material 22 includes a substantially flat lower surface and an upper surface 22a. In an embodiment of the present invention, the lower surface is adhered to the roof substrate 20 or the decking material 52 of the roof deck 50 with a polymer adhesive 40, preferably polyurethane, described in greater detail below. It is to be understood that the amount of adhesive required to adhere the insulating sheet material 22 to the roof substrate 20 or roof deck 50 will depend upon the installer, the bonding strength of the materials and the environmental and/or load conditions to which the system is being designed. A plurality of insulating sheets 22 of substantially uniform size are positioned in abutting contact with each other on the roof deck 50 as shown in FIG. 2. The insulating sheets 22 are preferably sized for convenience of handling. For example, the sheets may be 4' by 8', or 4' by 4', or sized in relation to the tile components 10 to be attached thereon as will be explained below. Additionally, it is to be understood that the roofing installer may prefer to place all of the insulating sheets 22 on a face of the pitched roof deck 50 prior to the installation of the roof tiles 10 or may choose to install the roof tiles 10 on each insulating sheet 22 upon adhering the insulating sheet 22 to the roof substrate 20. Yet another alternative is to install a row of the insulating sheets 22 prior to installing the roof tiles 10.

The roof tiles 10 are preferably adhered to the upper surface 22a of the sheet material 22 with an adhesive such as the polymer adhesive 40. Preferably, the polymer adhesive 40 is a polyurethane described in greater detail below. A method of attaching the roof components 10 to a roofing substrate and a typical polymer adhesive 40 are disclosed in assignee's U.S. Pat. No. 5,362,342, issued to Murray et al., which is incorporated by reference. However, it is to be understood that the present invention is not limited to the method and adhesive disclosed in U.S. Pat. No. 5,362,342.

Figure 5:
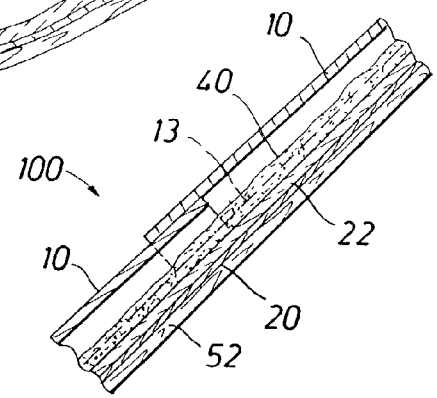
FIG. 5 is a view taken along lines 5-5 of FIG. 4.

One method of attaching the roof components 10 with the polymer adhesive 40 is shown in FIGS. 3-5. Referring to FIG. 3, the roof components 10 are installed in rows beginning along the lower edge of the roof. One or more pads or paddies 18 are located at or adjacent the position where the first pan portion 13 of the roof component 10 will be situated on the insulating sheet 22 adhered to the roofing substrate 20. The roof component 10 is then adhered to the insulating sheet 22. Referring to FIG. 3, a worker places one or more paddies 18 of the polymer adhesive 40 on the insulating sheet 22 at a location at which the roof component 10' is to be applied. The roof component 10' is placed adjacent to the previously installed roof component 10 so that the first edge 12 of the second roof component 10' overlaps and interlocks the second edge 14 of the first roof component 10. The first pan portion 13 of the roof component 10 is positioned in and above the paddy or paddies 18 of polymer adhesive 40 during the reactivity period of the polymer adhesive 40. Due to the interlocking connection of adjacent roof components 10 as shown in FIG. 3, the polymer adhesive 40 is not required beneath the second pan portion 15 of the roof component 10. One or more paddies 18 beneath the second pan portion 15 may be used to obtain an even greater bond between the insulating sheet 22 and the roof component 10, if desired. It is to be understood that the above described method may be preferred for the tile shape shown in the drawings although other arrangements of placement of amounts of adhesive 40 can be used. Further, it is to be understood that other tile shapes used with the present invention may require other arrangements and/or placement of the adhesive 40 to bond the roof component 10 to the insulating sheet 22.

According to one embodiment of the present invention, the polymer adhesive 40 may be a foamable or a non-foamable polymer adhesive. Preferably, the polymer adhesive 40 is a plural component, liquid polyurethane foam. The significant advantage of the plural component polyurethane foam is being able to walk on the installed roof components 10 shortly after the roof components 10 have been installed without affecting the bond between the roof component 10 and insulating sheet 22. The reactivity period or rise time of the plural component liquid polyurethane foam 40 of the present invention is preferably about one-half to about ten minutes and most preferably about one and one-half to about four minutes. It is important that the roof component 10 be properly placed during the reactivity period to achieve the required bonding of the roof component 10 to the insulating sheet 22. During the reactivity period, the liquid polyurethane foam 40 is an expanding foam, which will fill gaps and imperfections. The resulting foam provides excellent bonding between the roof component 10 and the insulating sheet 22 due to the adhesive properties of the urethane. It has been found that a reactivity period of less than about one-half minute makes it difficult to timely place the roof component 10 during the reactivity period.

The foamable liquid polyurethane 40 is preferably a froth foam. Froth foam chemistry is well known in the art of urethane foams. The froth foam may be formed by using blowing agents such as hydrogenated chlorofluorocarbon R22 (HCFC-R22), hydrogenated fluorocarbon 134A (HFC-134A), or chlorofluorocarbon R12 (CFC-R12). Preferably, the froth foam 40 is formed by using the hydrogenated blowing agents HCFC-R22 or HFC-134A, and not CFC-R12 due to CFC-R12's reported deleterious effects to the earth's ozone layer.

Preferably, the froth foam 40 has a consistency similar to a foamy shaving cream. The froth foam is preferable over other types of foams because it can be neatly and accurately dispensed without blowing or overspraying onto other areas of the roof deck or onto the outer surface of adjacently installed roof components 10. The preferred liquid polyurethane 40 with its shaving cream consistency does not run when placed onto a steeply pitched roof, but remains where it is installed on the insulating sheet 22. This ensures that the adhesive bond will be formed at the appropriate locations of the roof component 10. Additionally, the froth foam 40 begins expanding immediately upon application to the insulating sheet 22 and results in a firm bond with the underside of the roof component 10.

The liquid polyurethane 40 preferably has a density of about one to about eight pounds per cubic foot. It may be desirable to minimize the density of the liquid polyurethane 40 to minimize the weight on the roof while still providing an excellent bonding of the roof component 10 to the insulating sheet 22. It has been found to be most preferable to have a foam density of about one and one-half to about two pounds per cubic foot. The application rate of the liquid polyurethane 40 is preferably about one to about six pounds per minute and most preferably about two to about three pounds per minute.

Referring to FIGS. 4 and 5, a second row of roof components 10 is shown overlapping the lower row of roof components 10. As shown in FIG. 5, the first pan portion 13 does not rest on the insulating sheet 22 along its entire length. The first pan portion 13 at the highest end of roof component 10 comes into contact or very near contact with the insulating sheet 22 but moves gradually away from the insulating sheet 22 at the lowest end where it overlaps the lower roof component 10. The foamable liquid polyurethane 40 expands and fills the gaps between the insulating sheet 22 and the first pan portion 13. The excess foam continues expanding and provides further bonding with adjacent surface areas of the roof component 10 as shown in FIGS. 3-5. A thin layer of foam may be present between the insulating sheet 22 and the first pan portion 13 at the highest end of the roof component 10 depending on the placement of the paddy or paddies 18.

Referring to FIG. 5, the expanding foam 40 also provides a bond between the upper roof component 10 and the lower roof component 10 at the overlapping portion where the expanding foam can fill any gap between the two roof components 10. This further enhances the overall bonding capacity of the roof components 10 to the insulating sheet 22.

Figure 6:
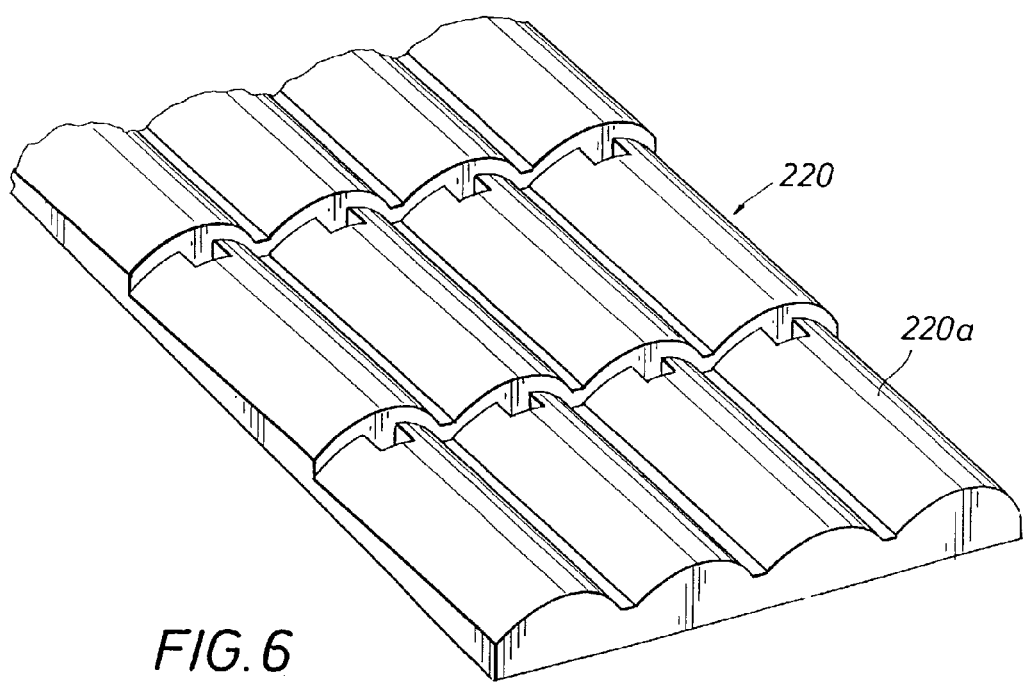
FIG. 6 is perspective view of a contoured insulating sheet.

As shown in FIG. 6, a second embodiment of the insulating sheet 220 may include a contoured upper surface 220a as opposed to the generally flat upper surface 22a of the insulating sheet 22. The contoured upper surface 220a preferably corresponds with the lower profile of the roof tile 10 to be installed thereon. The contoured upper surface 220a provides guidance in properly placing and aligning the roof tiles 20 on the pitched roof. A panel having a contoured upper surface is presently available in Japan and is known as a "Yuka panel." The Yuka panel is currently used in Japan with a trowel-applied paste material providing the bonding medium of the Yuka panel to the substrate as well as the bonding medium of the roof tile 10 to the Yuka panel. In the present invention the polymer adhesive 40 is used to adhere the roof tile 10 to the contoured upper surface 220a of the insulating sheet 220. The Yuka panel is typically sized for placement of approximately four rows of approximately four tiles in each row. The contoured surface 220a aids in ensuring that the roof tiles 10 are properly placed to provide a more pleasing aesthetic appearance. The panel 220 preferably has a thickness sufficient to provide enhanced insulative properties. For example, the panel thickness may be one or two inches thick, but may also depend on roof tile shape if using the contoured panel 220.

It is to be understood that the present invention is an insulated pitched tile roofing system and method 100 that can be used on pitched roof decks 50 made of various materials, including but not limited to wood, metal and concrete. The system 100 according to an embodiment of the present invention includes an insulating sheet 22, 220 adhered with a polymer adhesive 40 to the pitched roof deck 50 or the roof substrate 20 attached to the pitched roof deck 50. The roof tiles 10 are adhered with the polymer adhesive 40 to the insulating sheet 22, 220. The upper surface 220a of the insulating sheet 220 may be contoured to aid in properly placing the roof tiles 10. The improved roofing system 100 provides a well insulated roof for energy efficiency.

A few embodiments of a pitched roofing system and method of installing same according to the present invention have thus been set forth. However, the invention should not be unduly limited to the foregoing, which has been set forth for illustrative purposes only. Various modifications and alterations of the invention will be apparent to those skilled in the art, without departing from the true scope of the invention.

We claim:

1. An insulated pitched roofing system for insulating a pitched roof deck and attaching overlapping tile roof components thereto, the system comprising:
    a plurality of insulation boards of unitary construction, each said insulation board adhered and bonded to the pitched roof deck, each said insulation board having a planer upper surface and each said insulation board placed in abutting contact with an adjacent said insulation board to form a continuous, uniform insulative layer;
    a polymer adhesive adhering said plurality of insulation boards to the pitched roof deck and
    said polymer adhesive adhering the overlapping tile roof components to said plurality of insulation boards.

2. The insulated pitched roofing system of claim 1, wherein said polymer adhesive is a polyurethane.

3. The insulated pitched roofing system of claim 1, wherein said polymer adhesive is a foamable polymer adhesive.

4. The insulated pitched roofing system of claim 3, wherein said polymer adhesive is a plural component, liquid polyurethane foam.

5. The insulated pitched roofing system of claim 1, wherein each said board of said plurality of insulation boards includes a substantially flat lower surface adhered to the pitched roof deck.

6. The insulated pitched roofing system of claim 1, wherein each said board of said plurality of insulation boards includes a continuous flat upper surface to which the tile roof components are adhered.

7. In a pitched roofing system having a deck, a waterproof membrane attached to the deck, and overlapping profiled tile roof components, the improvement comprising:
    an insulative layer between the waterproof membrane and the profiled tile roof components, said insulative layer comprising a plurality of insulation boards arranged in contacting relationship with each other on the waterproof membrane, each said insulation board having a generally flat upper surface and a lower surface,
    a polymer adhesive adhering said lower surface of said plurality of insulation boards to the waterproof membrane, and
    said polymer adhesive adhering the profiled tile roof components to said upper surface of said plurality of insulation boards.

8. The pitched roofing system of claim 7, wherein said plurality of insulation boards are made of expanded rigid polystyrene plastic.

9. The pitched roofing system of claim 7, wherein said insulative layer has a continuous planer upper surface.

10. The pitched roofing system of claim 9, wherein said polymer adhesive is an expanding polyurethane foam.

11. An energy efficient, waterproof, pitched roofing system for installation on a roof deck attached to a plurality of pitched truss rafters, the system comprising:
    a waterproof substrate attached to the roof deck;
    a plurality of insulation boards arranged in contacting relationship with one another and adhesively bonded to said waterproof substrate with a polymer adhesive; and
    a plurality of profiled tile roof components adhesively bonded to said plurality of insulation boards with said polymer adhesive,
    said polymer adhesive being an expanding foam adhesive.

12. The pitched roofing system of claim 11, wherein said arranged plurality of insulation boards comprise a substantially continuous planer lower surface bonded to said waterproof substrate and a substantially continuous planer upper surface.

\* \* \* \* \*